(12) United States Patent
Ji

(10) Patent No.: US 10,145,092 B2
(45) Date of Patent: Dec. 4, 2018

(54) DEVICE FOR PREVENTING BACKFLOW

(71) Applicant: Shanghai Kohler Electronics, LTD., Shanghai (CN)

(72) Inventor: Yong Ji, Shanghai (CN)

(73) Assignee: SHANGHAI KOHLER ELECTRONICS, LTD. (CN)

( * ) Notice: Subject to any disclaimer, the term of this patent is extended or adjusted under 35 U.S.C. 154(b) by 281 days.

(21) Appl. No.: 15/179,652

(22) Filed: Jun. 10, 2016

(65) Prior Publication Data
US 2016/0362878 A1 Dec. 15, 2016

(30) Foreign Application Priority Data

Jun. 11, 2015 (CN) .......................... 2015 1 0319402

(51) Int. Cl.
*E03C 1/10* (2006.01)
*F16K 31/12* (2006.01)
(Continued)

(52) U.S. Cl.
CPC ................ *E03C 1/102* (2013.01); *E03C 1/10* (2013.01); *F16K 7/17* (2013.01); *F16K 21/18* (2013.01);
(Continued)

(58) Field of Classification Search
CPC . E03C 1/102; E03C 1/108; F16K 7/17; F16K 7/14; F16K 21/02; F16K 21/18;
(Continued)

(56) References Cited

U.S. PATENT DOCUMENTS

| 207,483 | A | * | 8/1878 | Blessing | .................. A01J 5/04 |
| | | | | | 137/404 |
| 630,043 | A | * | 8/1899 | Foster | ....................... A01J 5/04 |
| | | | | | 137/404 |

(Continued)

FOREIGN PATENT DOCUMENTS

| CN | 201992133 U | 9/2011 |
| CN | 103290902 A | 9/2013 |

(Continued)

OTHER PUBLICATIONS

First Office Action in related Chinese Application No. 201510319402.2 dated Mar. 3, 2017 and English translation, 9 pages.

*Primary Examiner* — Reinaldo Sanchez-Medina
*Assistant Examiner* — Hailey K Do
(74) *Attorney, Agent, or Firm* — Foley & Lardner LLP

(57) ABSTRACT

A backflow prevention device including a tank inside of and moveable relative to a housing. A cap coupled to the housing and including inlet and outlet chambers fluidly connected through an inlet, the outlet chamber communicating with the tank. A shell is connected to the cap and includes a shell inlet chamber, which communicates with a first outlet hole of the inlet chamber, and a second outlet hole, which communicates with the tank. An inlet sealing member opens/closes the inlet to fluidly connect/disconnect the inlet chamber and the outlet chamber; and an outlet hole sealing member is moveable with the tank to open/close the second outlet hole. Closing the second outlet hole prevents water from flowing through the second outlet hole and switches the inlet from open to closed. Opening the second outlet hole allows water to flow through the second outlet hole and switches the inlet to open.

20 Claims, 13 Drawing Sheets

(Section B-B)

(Section C-C)

(51) Int. Cl.
*F16K 7/17* (2006.01)
*F16K 21/18* (2006.01)
*F16K 31/126* (2006.01)

(52) U.S. Cl.
CPC ..... *F16K 31/1266* (2013.01); *Y10T 137/3149* (2015.04); *Y10T 137/7342* (2015.04); *Y10T 137/7374* (2015.04); *Y10T 137/7762* (2015.04); *Y10T 137/7768* (2015.04)

(58) Field of Classification Search
CPC .. F16K 31/126; F16K 31/1266; F16K 31/128; F16K 31/365; Y10T 137/27; Y10T 137/3149; Y10T 137/7303; Y10T 137/7342; Y10T 137/7355; Y10T 137/7349; Y10T 137/7352; Y10T 137/7762; Y10T 137/7761; Y10T 137/7768; Y10T 137/7374
See application file for complete search history.

(56) References Cited

U.S. PATENT DOCUMENTS

| | | | | |
|---|---|---|---|---|
| 879,558 | A * | 2/1908 | Ledoux | A01K 39/022 137/408 |
| 1,646,705 | A * | 10/1927 | Peiler | C03B 7/01 119/81 |
| 2,790,633 | A * | 4/1957 | Seldon | F02M 1/00 137/404 |
| 3,020,729 | A * | 2/1962 | Brandin | F16L 53/002 137/404 |
| 4,357,827 | A * | 11/1982 | McConnell | G01N 5/02 137/408 |
| 4,977,923 | A * | 12/1990 | Cho | F16K 21/18 137/403 |
| 5,421,515 | A * | 6/1995 | Rinkewich | A01G 27/003 137/408 |
| 6,325,094 | B1 * | 12/2001 | Rodgers | G05D 9/02 137/2 |
| 6,332,475 | B1 * | 12/2001 | Brougham | F16K 31/34 137/244 |
| 6,994,107 | B2 * | 2/2006 | Sosa | F16K 21/18 137/389 |

FOREIGN PATENT DOCUMENTS

| | | |
|---|---|---|
| CN | 103362184 A | 10/2013 |
| CN | 204139273 U | 2/2015 |
| EP | 0 761 892 A1 | 3/1997 |

* cited by examiner

FIG. 6 (Section A-A)

FIG. 7 (Section B-B)

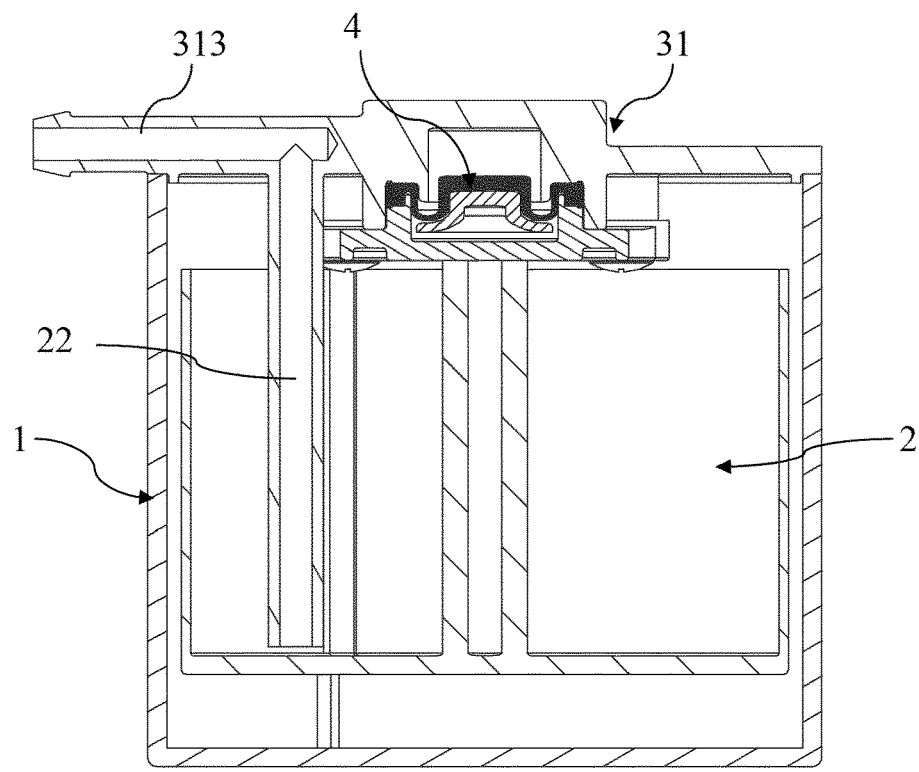
FIG. 10 (Section C-C)
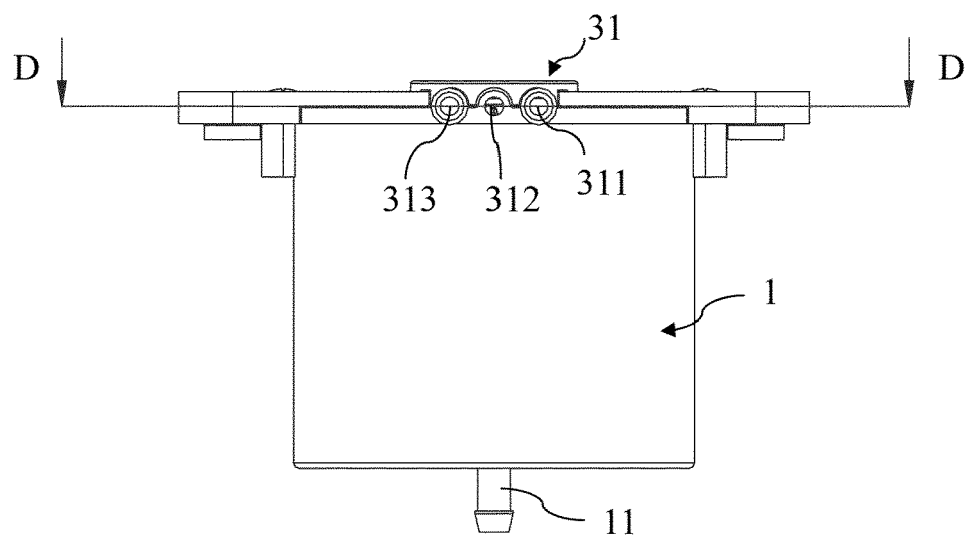
FIG. 11

FIG. 12 (Section D-D)

DEVICE FOR PREVENTING BACKFLOW

CROSS-REFERENCE TO RELATED PATENT APPLICATIONS

This application claims the benefit of and priority to Chinese Patent Application No. 201510319402.2, filed Jun. 11, 2015, the entire disclosure of which is incorporated herein by reference, including the specification, drawings, claims, and abstract thereof.

BACKGROUND

The present application relates generally to the field of bathroom supporting facilities and technologies. More specifically, this application relates to a backflow prevention device connected between drinking water and a facility.

A drinking water system is typically connected to bathroom apparatuses (e.g. a toilet) for water supply, and it is possible to have potential contaminated water downstream. Due to back pressure or siphonage, water in the apparatus back flows to the upstream drinking water system and thus contaminates the upstream drinking water.

At present, a backflow prevention device is typically provided at the rear end of the inlet solenoid valve to prevent the above phenomenon and ensure the security of the drinking water system.

Common backflow prevention devices on the market usually adopt a control circuit to control water volume so as to achieve the goal of backflow prevention. For example, the backflow prevention device disclosed by Chinese Patent Application No. 201110071501.5 that is connected between a bathroom apparatus and a drinking water system uses a pin-type or capacitance-type structure to control the level of the backflow device, leading to a complex apparatus structure and poor reliability. The circuit part is in a humid environment and tends to be damaged.

SUMMARY

One embodiment relates to a backflow prevention device (e.g., for use with a bathroom apparatus) that includes a housing, a water tank disposed inside of the housing and moveable relative to the housing, a control valve cap, a control valve shell, an inlet sealing member, and an outlet sealing member. The control valve cap is coupled to the housing and includes a control valve inlet chamber and a control valve outlet chamber fluidly connected through an inlet. The control valve outlet chamber fluidly communicates with the water tank and the control valve inlet chamber includes a first outlet hole. The control valve shell is connected to the control valve cap and includes a shell inlet chamber that communicates with the first outlet hole. The shell inlet chamber includes a second outlet hole that communicates with the water tank. The inlet sealing member is configured to open/close (i.e., for opening/closing) the inlet to fluidly connect/disconnect the control valve inlet chamber and the control valve outlet chamber. The outlet hole sealing member is moveable with the water tank to open/close the second outlet hole. When the second outlet hole is closed, water is prevented from flowing through the second outlet hole and the inlet switches from an open state to a closed state. When the second outlet hole is open, water flows through the second outlet hole and the inlet switches from the closed state to the open state Another embodiment relates to a backflow prevention device for use with a bathroom apparatus. The backflow prevention device includes a tank for holding water, a control valve assembly, a first sealing member, and a second sealing member. The control valve assembly includes a cap having an inlet chamber and an outlet chamber, which is fluidly connected with the tank, and a shell coupled to the cap. The shell includes an inlet chamber that fluidly communicates with an outlet hole of the cap. The inlet chamber of the shell includes an outlet hole that fluidly communicates with the tank. The first sealing member is moveable relative to the cap between a first position, in which the inlet and outlet chambers of the cap are fluidly connected, and a second position, in which inlet and the outlet chambers of the cap are fluidly disconnected. The second sealing member is moveable relative to the shell between an open position, in which inlet chamber of the shell is fluidly connected to the tank, and a closed position, in which inlet chamber is fluidly disconnected from the tank.

Another embodiment relates to a control valve assembly for use in a backflow prevention device having a water tank moveably disposed in a housing. The control valve assembly includes a cap, a shell, a first sealing member, and a second sealing member. The cap is configured to couple to the housing and includes an inlet chamber and an outlet chamber, which is fluidly connected with the water tank. The shell is coupled to cap and includes an inlet chamber that is fluidly connected with both the cap and the water tank. The first sealing member is located between the cap and the shell. The first sealing member is moveable relative to the cap between an open position, in which the inlet chamber of the cap is fluidly connected with the outlet chamber of the cap to permit water to move freely between the inlet and outlet chambers of the cap, and a closed position, in which inlet chamber of the cap is fluidly disconnected with the outlet chambers of the cap to prevent water from flowing between the inlet and outlet chambers of the cap. The second sealing member is disposed in the inlet chamber of the shell between the first sealing member and a bottom of the shell. The second sealing member moves linearly in the inlet chamber of the shell relative to the shell between an open position, in which inlet chamber of the shell is fluidly connected to the water tank to permit water to flow from the inlet chamber of the shell into the water tank, and a closed position, in which inlet chamber is fluidly disconnected from the water tank to prevent water from flowing from the inlet chamber of the shell into the water tank.

Yet another embodiment relates to a backflow prevention device including a protective housing, a mobile water tank and a control valve assembly. The control valve assembly includes a control valve cap and a control valve shell. The control valve cap is provided with a control valve inlet chamber and a control valve outlet chamber therein, the control valve outlet chamber and the control valve inlet chamber communicate with each other via (e.g., through) an inlet, the control valve outlet chamber communicates with the mobile water tank, and the control valve inlet chamber is provided with a first outlet hole therein. The control valve cap is provided with an inlet sealing member therein. The control valve shell is provided with a shell inlet chamber therein, and the shell inlet chamber is provided with a second outlet hole therein. The shell inlet chamber is further provided with an outlet hole sealing member therein. The backflow prevention device employs a structure that is purely mechanical to control the water pressure switch inside the control valve assembly and realize the opening or closing of the inlet, which can switch rapidly between two operating modes, water supply/water recharging, and effectively prevent backflow while maintaining the normal operations of an apparatus.

BRIEF DESCRIPTION OF THE DRAWINGS

FIG. 10 is a cross-sectional view of the backflow prevention device shown in FIG. 5 taken along line C-C in FIG. 5.

FIG. 11 is a side view of the backflow prevention device shown in FIG. 1.

DETAILED DESCRIPTION

Figure 1:
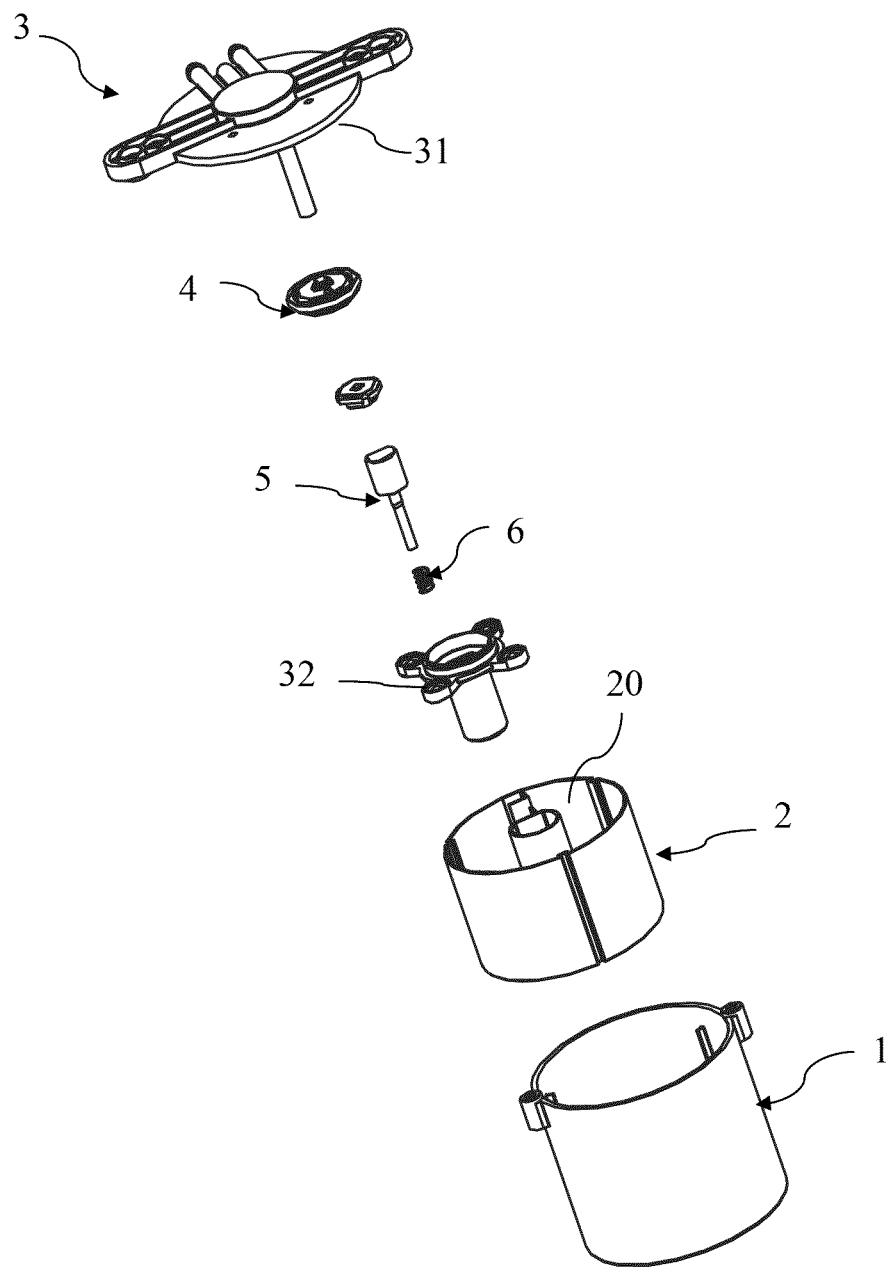
FIG. 1 is an exploded view of an exemplary embodiment of a backflow prevention device, according to the present application.
Figure 2:
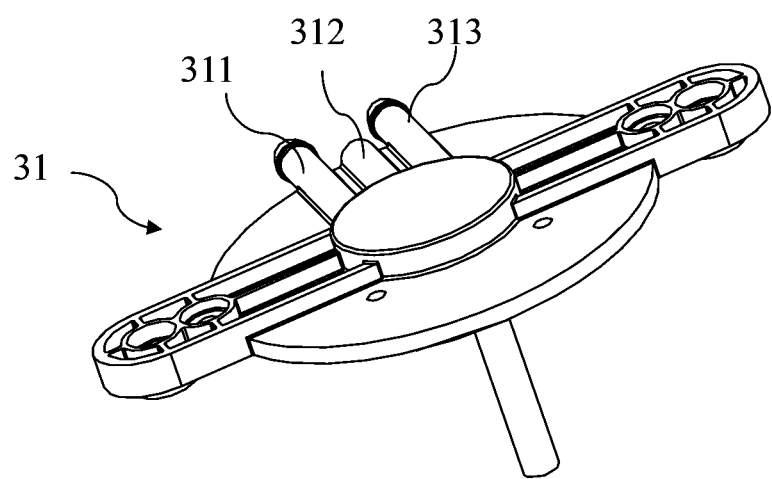
FIG. 2 illustrates an exemplary embodiment of a structure of a control valve cap for use with a backflow prevention device.
Figure 3:
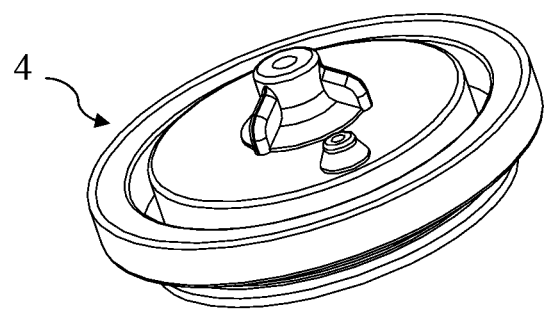
FIG. 3 illustrates an exemplary embodiment of a structure of an inlet sealing member for use with a backflow prevention device.

According to various exemplary embodiments, backflow prevention devices as disclosed herein may advantageously overcome certain known drawbacks by providing a simplified structure that provides a more stable operation and effectively prevents backflow.

According to an exemplary embodiment, a backflow prevention device includes a protective housing, a mobile water tank disposed inside the protective housing, and a control valve assembly disposed on the protective housing, the top of the mobile water tank being provided with a tank opening. The control valve assembly includes a control valve cap and a control valve shell that may be connected sequentially. The control valve cap is provided with a control valve inlet chamber and a control valve outlet chamber therein, the control valve outlet chamber and the control valve inlet chamber communicate with each other via (e.g., through) an inlet, the control valve outlet chamber communicates with the mobile water tank, and the control valve inlet chamber is provided with a first outlet hole therein. The control valve cap is further provided with an inlet sealing member therein for controlling the switch of the inlet. The control valve shell is provided with a shell inlet chamber therein that communicates with the first outlet hole, and the shell inlet chamber is provided with a second outlet hole therein that communicates with the mobile water tank. The shell inlet chamber is further provided with an outlet hole sealing member therein for controlling the switch of the second outlet hole, and the outlet hole sealing member maintains synchronous movements with the mobile water tank. When the second outlet hole is in a closed state, the inlet is switched from an opening state (e.g., open position) to a closed state (e.g., closed position); and when the second outlet hole is in an opening state, the inlet is switched from the closed state to the opening state.

The area of the second outlet hole may be greater than the area of the first outlet hole.

A water stop rib may be formed inside the control valve cap and may extend toward the inlet sealing member. The inlet may be formed between the inlet sealing member and the water stop rib, such that the inlet sealing member can move upward under the action by the water pressure inside the control valve assembly to engage with the water stop rib to close the inlet and can move downward to disengage from the water stop rib to open the inlet.

The control valve inlet chamber and the control valve outlet chamber may both have annular shapes. The control valve inlet chamber may be disposed on an outer side of the control valve outlet chamber, and an annular chamber water stop rib may be disposed between the control valve inlet chamber and the control valve outlet chamber.

The second outlet hole may be disposed on the inlet chamber bottom plate of the shell inlet chamber. The outlet hole sealing member may include a sealing member head slidably disposed inside the shell inlet chamber, a conical (e.g., frusto-conical) sealing portion connected with the sealing member head and capable of sealing the second outlet hole, and a sealing member body connected with the conical sealing portion and extending through the second outlet hole such as to connect (e.g., couple) to the mobile water tank. The connection between the water tank and the outlet hole sealing member may synchronize movement between these elements. A radius of the conical sealing portion may be configured to gradually increase, such as when moving in the direction from the sealing member body toward the sealing member head.

A gap may be formed between the sealing member body and an edge of the second outlet hole or an edge of the control valve shell that defines the second outlet hole. The gap permits for water to be discharged, such as from the inlet chamber of the shell into the tank. The area of the gap may be greater than the area of the first outlet hole.

A reset spring may be provided between the inlet chamber bottom plate and the outlet hole sealing member, such as to bias an element (e.g., the outlet hole sealing member, tank, etc.) in a direction (e.g., upward direction).

The control valve shell may be disposed within the mobile water tank.

The protective housing may include a water drain pipe thereon, such as to discharge excess water from the device (e.g., the housing).

The backflow prevention devices of the present application may provide the advantages discussed below, such as by employing one or more of the above noted elements of the devices.

The backflow prevention devices of the present application may advantageously drive the outlet hole sealing member to move through the mobile water tank. For example, when water in the mobile water tank meets a specified condition, the mobile water tank moves downward and drives the outlet hole sealing member to move downward to close the second outlet hole. When the water pressure in the shell inlet chamber is the same as the water pressure in the control valve cap, the inlet sealing member moves upward to return to the initial position to close the inlet. At this moment, the control valve inlet chamber no longer supplies water to the control valve outlet chamber.

When water in the mobile water tank is discharged to a specified condition, the mobile water tank moves upward and drives the outlet hole sealing member to move upward to open the second outlet hole. At this moment, water in the shell inlet chamber flows into the mobile water tank, as water in the shell inlet chamber decreases rapidly, the water pressure in the shell inlet chamber is lower than the water pressure in the control valve cap, which drives the inlet sealing member to move downward to open the inlet. At this moment, the control valve inlet chamber supplies water to the control valve outlet chamber, and the control valve outlet chamber supplies water to the mobile water tank.

Since the top of the mobile water tank is provided with a tank opening, a certain air gap or distance is present between the tank opening and the inlet pipeline thereabove. When backflow takes place, the dirty water enters the mobile water tank and ultimately is discharged into the protective housing via (e.g., through) the tank opening, thereby ensuring that dirty water will not back flow to the pipeline thereabove or the tap water pipeline.

Therefore, the backflow prevention devices, as disclosed in the present application, employ a structure that is purely mechanical to control the water pressure switch inside the control valve assembly, to control the movement of the inlet sealing member through the water pressure difference inside the control valve assembly, and to control the opening/closing of the inlet sealing member. Thus, the backflow prevention devices can switch rapidly between two operating modes, i.e., a water supply mode and a water recharging mode, and can effectively prevent backflow while maintaining the normal operations of an apparatus employing the backflow prevention device. Due to the adoption of a structure that is purely mechanical, at the same time, the backflow prevention devices have simple structures with high reliability and reduced cost.

Referring now generally to the Figures, the backflow prevention devices of this application are used to prevent backflow of water in apparatuses (e.g., bathroom apparatuses, kitchen apparatuses, etc.) that utilize clean water to prevent contamination of the clean water that may be used for drinking. For example, the backflow prevention devices of this application may be used in bathroom apparatuses to prevent backflow of water in the bathroom apparatuses and to prevent contamination of drinking water.

Specific embodiments of the present application will now be described with reference to the accompanying Figures. Identical parts therein are represented with the same legends (e.g., reference numerals, terms, etc.).

FIGS. 1-13 illustrate an exemplary embodiment of a backflow prevention device that includes a protective housing 1, a mobile water tank 2, and a control valve assembly 3. The mobile water tank 2 may be disposed inside the protective housing 1, and the control valve assembly 3 may be disposed on the protective housing 1. A top of the mobile water tank 2 is provided with a tank opening 20 such as to receive at least a portion of the control valve assembly 3.

Figure 6:
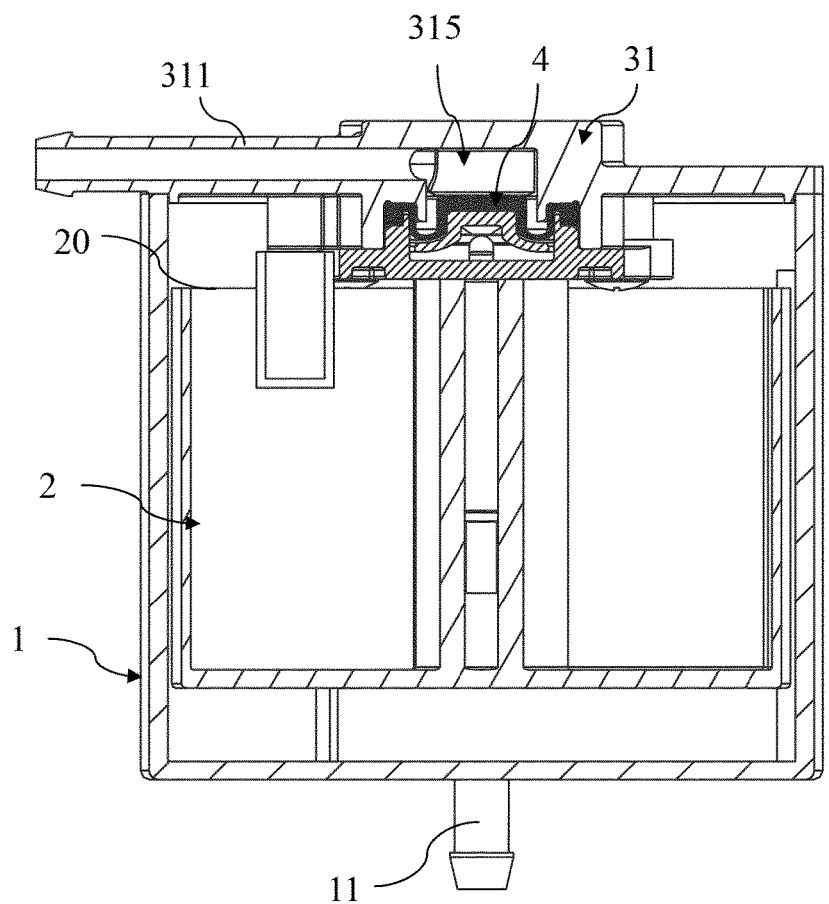
FIG. 6 is a cross-sectional view of the backflow prevention device shown in FIG. 5 taken along line A-A in FIG. 5.
Figure 7:
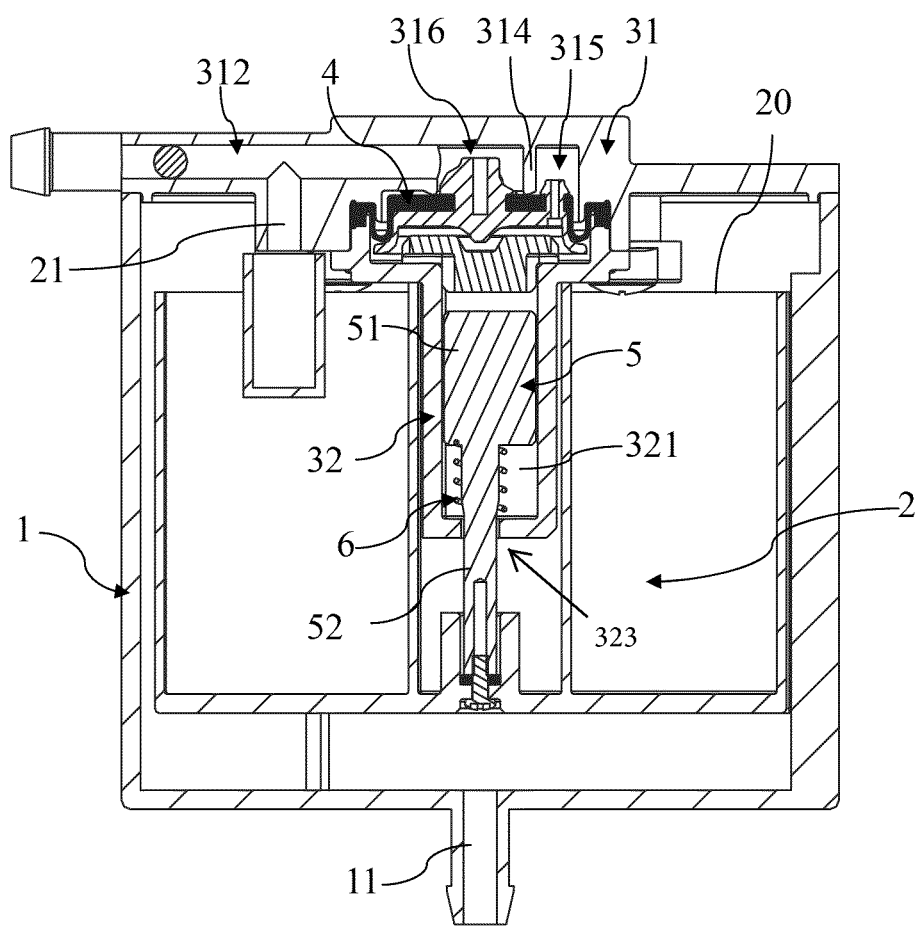
FIG. 7 is a cross-sectional view of the backflow prevention device shown in FIG. 5 taken along line B-B in FIG. 5.
Figure 8:
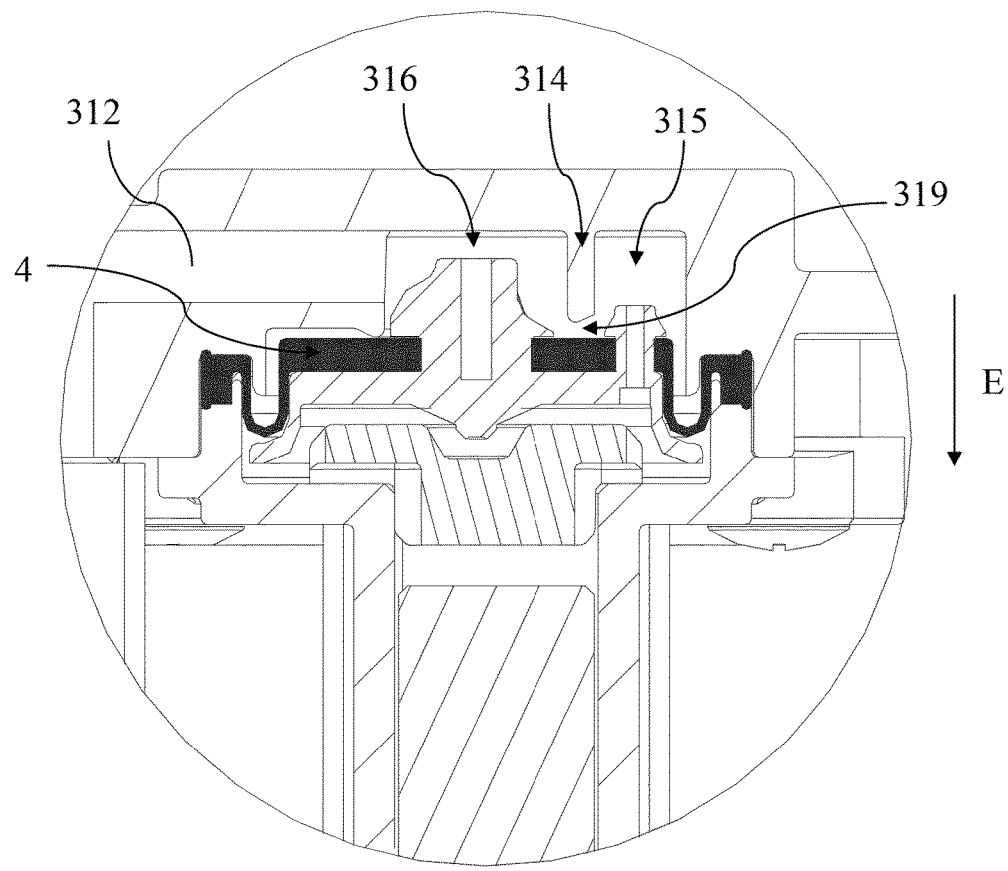
FIG. 8 is a detail view of a portion of the backflow prevention device shown in FIG. 7, with the inlet sealing member moving downward along the arrow E such that the inlet is in an open state.
Figure 12:
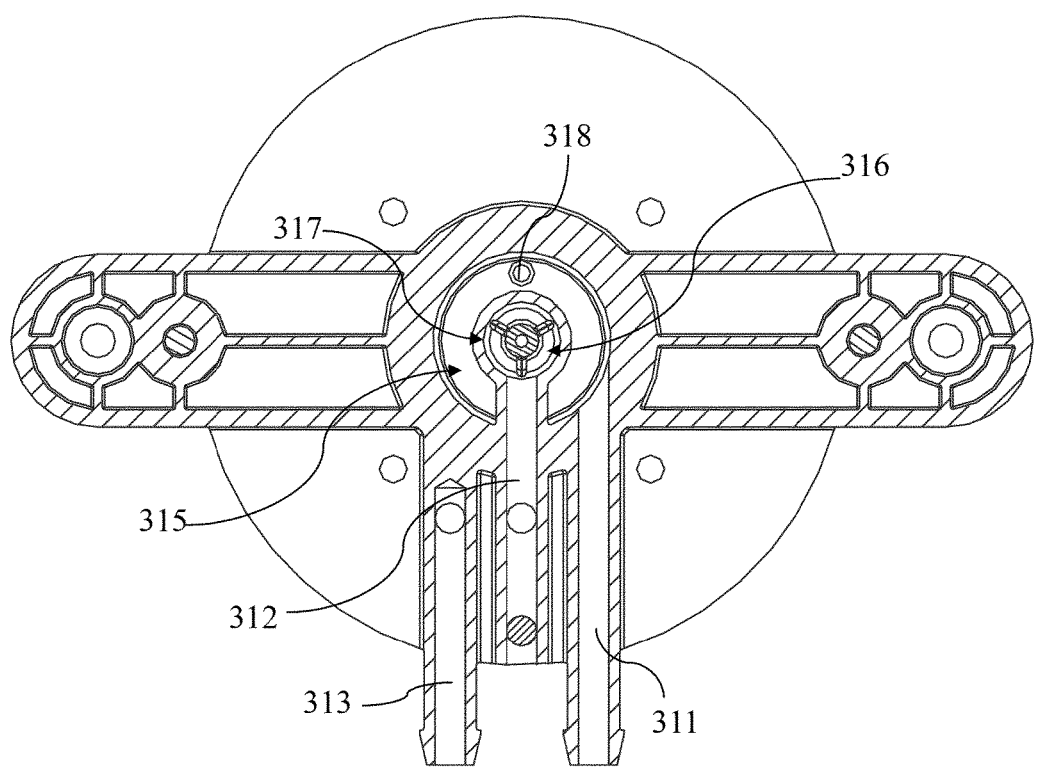
FIG. 12 is a cross-sectional view of the backflow prevention device shown in FIG. 11 taken along line D-D in FIG. 11.

The control valve assembly 3 of the backflow prevention device includes a control valve cap 31 and a control valve shell 32, which may be connected sequentially. As shown in FIGS. 6-8, the control valve cap 31 includes a control valve inlet chamber 315 and a control valve outlet chamber 316 therein. The control valve outlet chamber 316 and the control valve inlet chamber 315 communicate (e.g., fluidly) with each other through an inlet 319 (shown in FIG. 8). The control valve outlet chamber 316 also communicates (e.g., fluidly) with the mobile water tank 2. As shown in FIG. 12, the control valve inlet chamber 315 includes a first outlet hole 318, which communicates (e.g., fluidly) with the control valve shell 32, as discussed below.

Figure 9:
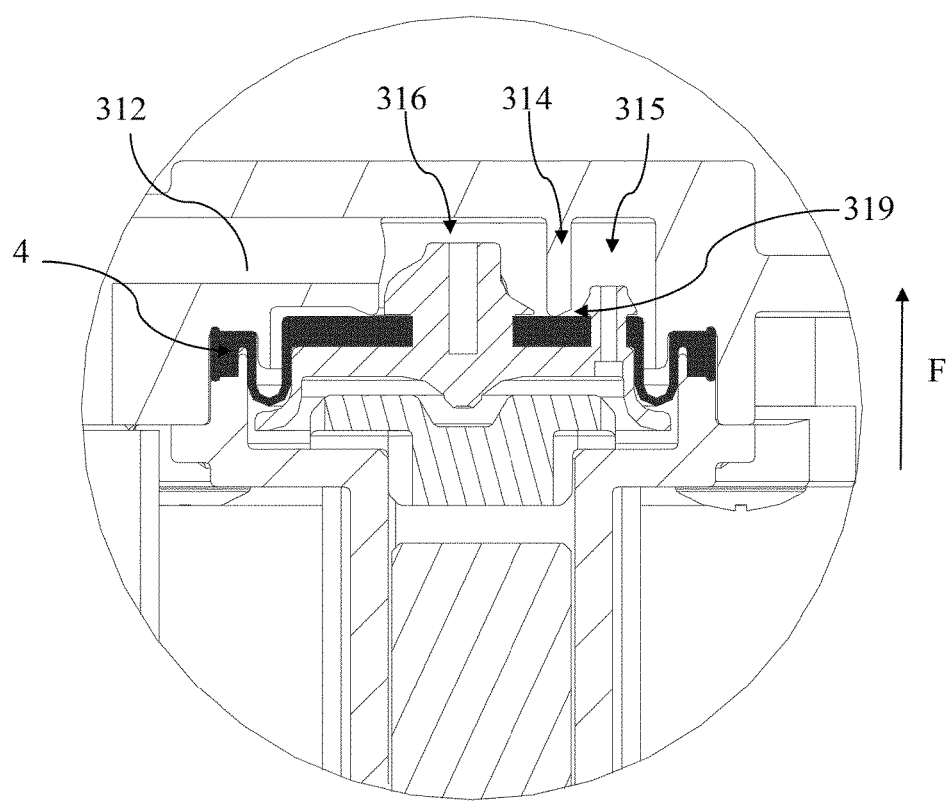
FIG. 9 is another detail view of a portion of the backflow prevention device shown in FIG. 7, with the inlet sealing member moving upward along the arrow F such that the inlet is in a closed state.

The backflow prevention device may include a sealing member that is configured to control flow (e.g., of water) through the inlet 319. As shown in FIGS. 8 and 9, an inlet sealing member 4 is disposed between the control valve cap 31 and the control valve shell 32, and the inlet sealing member 4 is provided to control the flow through the inlet 319. The sealing member 4 may move between an open state (as shown in FIG. 8) and a closed state (as shown in FIG. 9) for controlling flow through the inlet 319. Thus, the inlet sealing member 4 controls the switch of the inlet 319 between open and closed states (e.g., modes, positions, etc.).

Figure 4:
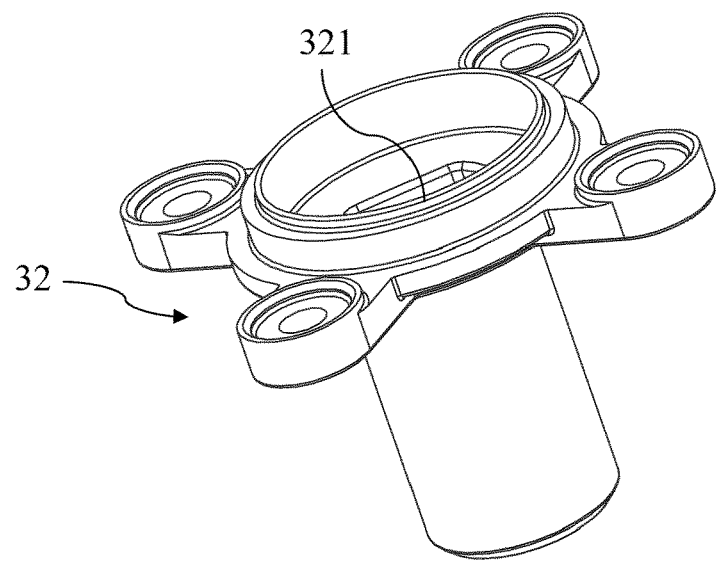
FIG. 4 illustrates an exemplary embodiment of a structure of a control valve shell for use with a backflow prevention device.
Figure 5:
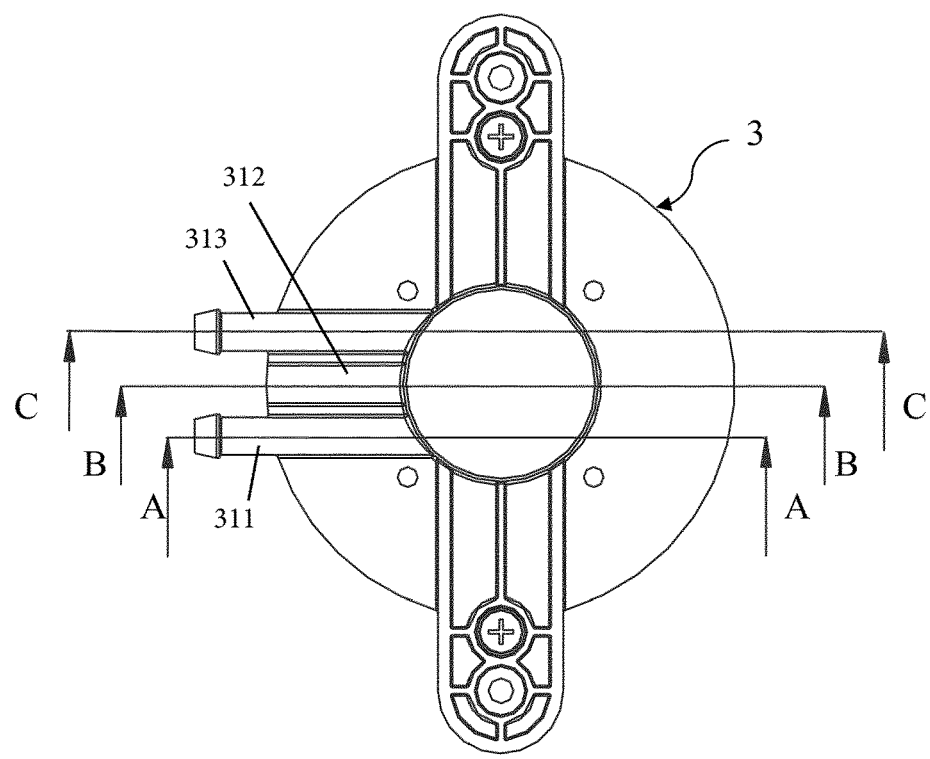
FIG. 5 is a top view of the backflow prevention device shown in FIG. 1.
Figure 16:
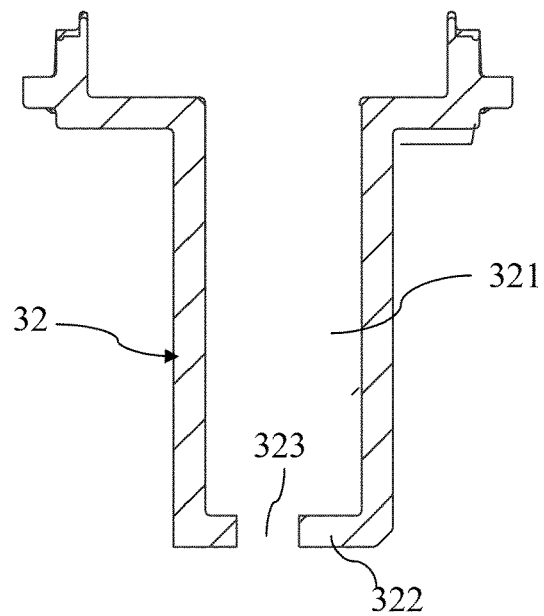
FIG. 16 is a cross-sectional view of the control valve shell shown in FIG. 4.

As shown in FIGS. 4 and 7, the control valve shell 32 of the control valve assembly 3 includes a shell inlet chamber 321 therein that communicates (e.g., fluidly) with the first outlet hole 318 of the control valve inlet chamber 315 (see FIG. 12). The shell inlet chamber 321 includes a second outlet hole 323 that communicates (e.g., fluidly) with the mobile water tank 2 (see FIGS. 7 and 16).

Figure 17:
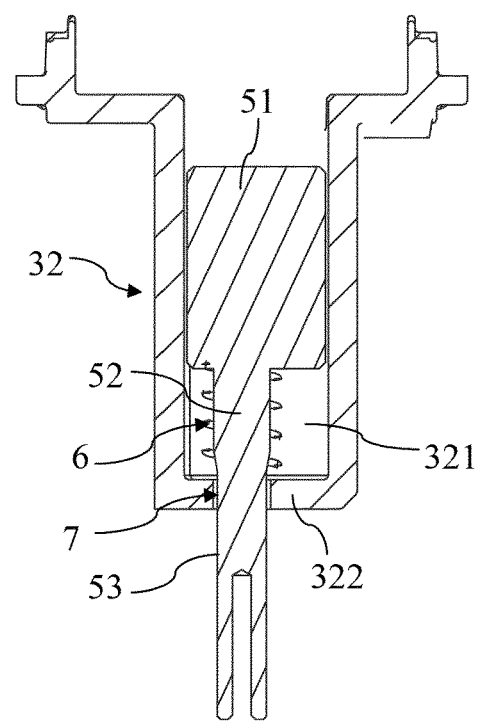
FIG. 17 is a cross-sectional view of the outlet hole sealing member shown in FIG. 14 engaging the control valve shell shown in FIG. 4.

The backflow prevention device may include a sealing member that is configured to control flow (e.g., of water) through the second outlet hole 323. As shown in FIGS. 1, 7 and 17, an outlet hole sealing member 5 is disposed in the shell inlet chamber 321 and is provided to control flow through the second outlet hole 323. The outlet hole sealing member 5 may be configured to move between an open state (e.g., position, mode, etc.), in which water is permitted to flow through the second outlet hole 323, and a closed state, in which water is prevented from flowing through the second outlet hole 323. Thus, the outlet hole sealing member 5 may control the switching of the second outlet hole 323 between open and closed states. As discussed below, the outlet hole sealing member 5 may be configured to maintain synchronous movement(s) with the mobile water tank 2.

The backflow prevention device may be configured such that when the second outlet hole 323 is in the closed state, the inlet 319 is switched from the open state to the closed state; and when the second outlet hole 323 is in the open state, the inlet 319 is switched from the closed state to the open state.

The protective housing 1 of the backflow prevention device includes an installation chamber, and the mobile water tank 2 is disposed within (e.g., installed inside of) the installation chamber of the protective housing 1.

As noted above, the top of the mobile water tank 2 is provided with the tank opening 20 (see FIG. 1). As shown in FIG. 7, the mobile water tank 2 includes a water tank inlet 21 that communicates (e.g., fluidly) with the control valve water supply pipeline. A predetermined (e.g., certain) distance or an air gap may be present between the tank opening 20 and the water tank inlet 21 or the water supply pipeline thereabove. When backflow takes place, the dirty water enters the mobile water tank 2 and ultimately is discharged into the protective housing 1 via the tank opening 20, thereby ensuring that dirty water will not back flow to the pipeline thereabove or the tap water pipeline.

The mobile water tank 2 can move upward and downward inside the protective housing 1 to drive the outlet hole sealing member 5 to open or close the second outlet hole 323. According to an exemplary embodiment, the mobile water tank 2 is configured to move downward under the force from gravity, the force from the weight of the mobile water tank 2 (itself) and/or the force from the weight of water. The mobile water tank 2 may be configured to move upward under the action of an external drive part. For example, the backflow prevention device may include a biasing member (e.g., a reset spring) to apply a force that bias the mobile water tank 2 upwardly. Thus, the reset spring may act against the downward forces present to move the mobile water tank 2 in an upward direction (e.g., vertical). The strength of the reset spring may be tailored to the application (e.g., weight of the tank, weight from volume of water containable in the tank, etc.). According to other examples, other types of drivers (e.g., actuators, etc.) may be employed to move the mobile water tank 2 upward.

According to an exemplary embodiment, when the volume of water in the mobile water tank 2 reaches a threshold volume (e.g., increases to and above a preset or predetermined volume), the mobile water tank 2 moves downward and drives the outlet hole sealing member 5 to engage with the second outlet hole 323 so as to close the second outlet hole 323. Thus, the second outlet hole 323 is in the closed state. When the volume of water in the mobile water tank 2 drops below the threshold volume (e.g., decreases below the preset or predetermined volume), the mobile water tank 2 moves upward and drives the outlet hole sealing member 5 away from the second outlet hole 323 so as to open the second outlet hole 323. Thus, the second outlet hole 323 is in the open state.

The control valve assembly 3, which includes the control valve cap 31 and the control valve shell 32, is installed on (e.g., assembled to, coupled to, etc.) the protective housing 1. The control valve cap 31 is installed at the top opening of the protective housing 1, and the control valve shell 32 is disposed inside the installation chamber of the protective housing 1.

As shown in FIGS. 2, 5-7 and 10-13, the control valve cap 31 is provided with a control valve inlet pipe 311, a control valve outlet pipe 312, and a water tank discharge pipe 313.

The control valve inlet pipe 311 is configured to be connected (e.g., fluidly) with a supply of fresh water (e.g., external drinking water). The control valve inlet pipe 311 communicates (e.g., fluidly) with the control valve inlet chamber 315 and keeps on supplying water into the control valve inlet chamber 315, such that there is always water in the control valve inlet chamber 315. The control valve inlet chamber 315 is provided with a first outlet hole 318 therein for supplying water into the shell inlet chamber 321.

The control valve outlet pipe 312 communicates (e.g., fluidly) with the water tank inlet 21 for supplying water from the control valve outlet chamber 316 into the mobile water tank 2. The control valve outlet chamber 316 communicates (e.g., fluidly) with the control valve inlet chamber 315 via the inlet 319 when the inlet 319 is in the open state. Accordingly, a large quantity of water in the control valve inlet chamber 315 can be supplied into the control valve outlet chamber 316 when the inlet 319 is in the open state. The control valve outlet chamber 316 then supplies water to the water tank inlet 21 through the control valve outlet pipe 312, and water enters the mobile water tank 2 via the water tank inlet 21.

The water tank discharge pipe 313 communicates with the water tank outlet pipe 22 for discharging water in the mobile water tank 2. For example, water located in the water tank can be discharged therefrom through the water tank outlet pipe 22 and then through the water tank discharge pipe 313.

The control valve shell 32 includes the shell inlet chamber 321 and the second outlet hole 323, which fluidly connects (e.g., communicates) the shell inlet chamber 321 with the mobile water tank 2. A portion (e.g., relatively small part) of water in the control valve inlet chamber 315 will enter the shell inlet chamber 321 through the first outlet hole 318, then the portion of water flows into the mobile water tank 2 through the second outlet hole 323.

As a result, the backflow prevention device has two pipelines to supply water into the mobile water tank 2. A first quantity of water in the control valve inlet chamber 315 is supplied into the mobile water tank 2 from the control valve outlet chamber 316; and a second quantity of water in the control valve inlet chamber 315 flows into the mobile water tank 2 through the first outlet hole 318 and the second outlet hole 323. According to an exemplary embodiment, the first quantity of water is relatively large compared to the second quantity of water (which accordingly is relatively small compared to the first quantity of water).

The control valve cap 31 may include the inlet sealing member 4, such as disposed therein. The inlet sealing member 4 can move upward and downward under the action of the water pressure in the control valve assembly 3 to control the inlet 319 to open or close. According to an exemplary embodiment, when a water pressure difference is present in the control valve assembly 3, the inlet sealing member 4 separates from (e.g., leaves, withdraws from, etc.) the inlet 319 to open the inlet 319. Thus, the inlet 319 is in the open state. When the water pressure in the control valve assembly 3 is approximately zero, the inlet sealing member 4 seals the inlet 319 to close the inlet 319. Thus, the inlet 319 is in the closed state. The water pressure difference herein refers to the water pressure difference between the shell inlet chamber 321 and the control valve cap 31. With respect to the water pressure difference, when the outlet hole sealing member 5 changes from a closed state to an opening state, water in the shell inlet chamber 321 quickly flows into the mobile water tank 2, such that water in the shell inlet chamber 321 decreases rapidly, leading to the decrease of the water pressure in the shell inlet chamber 321, which is lower than the water pressure in the control valve cap 31, thereby forming a water pressure difference.

An exemplary process/method that the backflow prevention device employs to open/close the inlet 319 through the inlet sealing member 4 will now be described.

When the second outlet hole 323 is in an open state, water flows into the mobile water tank 2 through the second outlet hole 323, leading to a water pressure in the shell inlet chamber 321 that is lower than a water pressure in the control valve cap 31. During this time, under the action of the water pressure difference in the control valve assembly 3, the inlet sealing member 4 moves to open the inlet 319, such that the inlet 319 is in an open state. As a result, when the second outlet hole 323 is in an open state, the inlet 319 is switched from a closed state to an open state; and when the inlet 319 is in the open state, the control valve inlet chamber 315 supplies water to the control valve outlet chamber 316.

When the second outlet hole 323 is in a closed state, water in the shell inlet chamber 321 no longer flows (into the mobile water tank 2 through the second outlet hole 323). During this time, the water pressure in the shell inlet chamber 321 is substantially equal to the water pressure in the control valve cap 31, causing the inlet sealing member 4 to seal (e.g., engage with) the inlet 319 to close the inlet 319, thereby preventing water from passing through the inlet 319. Thus, the inlet 319 is in a closed state. As a result, when the second outlet hole 323 is in a closed state, the inlet 319 is switched from an open state to a closed state; and when the inlet 319 is in the closed state, the control valve inlet chamber 315 is prevented from (e.g., stops) supplying water to the control valve outlet chamber 316.

The default position of the inlet sealing member 4 is in a sealing engagement with the inlet 319 (i.e., the inlet 319 in a closed state), and as long as the water pressure in the shell inlet chamber 321 is substantially equal to the water pressure in the control valve cap 31, the inlet sealing member 4 returns to this default position.

The shell inlet chamber 321 includes the outlet hole sealing member 5 therein to influence (e.g., control and regulate) the water pressures in the shell inlet chamber 321 and the control valve cap 31. According to an exemplary embodiment, the outlet hole sealing member 5 maintains synchronous movements with the mobile water tank 2 to control the opening/closing of the second outlet hole 323. That is, the outlet hole sealing member 5 may be coupled to the mobile water tank 2 such that both the outlet hole sealing member 5 and the mobile water tank 2 move together (e.g., in the same direction by the same magnitude).

An exemplary process/method that the backflow prevention device employs to open/close the second outlet hole 323 through the outlet hole sealing member 5 will now be described.

When the second outlet hole 323 is in an open state, a first quantity of water flows into the mobile water tank 2 mainly through the control valve outlet chamber 316, and a second quantity of water flows into the mobile water tank 2 mainly through the second outlet hole 323. According to an exemplary embodiment, the first quantity of water is relatively large compared to the second quantity of water. In this way, water in the mobile water tank 2 gradually increases.

When water in the mobile water tank 2 increases up to and including a threshold (e.g., preset, predetermined, etc.) amount (e.g., volume, weight), the mobile water tank 2 moves downward due to the force of gravity. The downward movement of the mobile water tank 2 synchronously drives the outlet hole sealing member 5 to move downward and seal the second outlet hole 323, such that the second outlet hole 323 is in a closed state.

When water in the mobile water tank 2 is discharged through the water tank discharge pipe 313, a weight (e.g., of the water and the mobile water tank 2) decreases. Once the weight drops below the threshold amount, the mobile water tank 2 begins to move upward. The upward movement of the mobile water tank 2 synchronously drives the outlet hole sealing member 5 to move upward and open the second outlet hole 323, such that the second outlet hole 323 is in an open state.

For the reasons described above, when water in the mobile water tank 2 increases to the threshold volume/weight, the second outlet hole 323 is in the closed state, and at the same time, the inlet 319 is also in the closed state. In this state of the backflow prevention device, the control valve outlet chamber 316 stops supplying water to the mobile water tank 2. Once the water in the mobile water tank 2 decreases below the threshold volume/weight, the second outlet hole 323 is opened (e.g., moves to the open state), and at the same time, the inlet 319 is opened as well. In this state of the backflow prevention device, the control valve outlet chamber 316 begins to supply water to the mobile water tank 2, thereby rapidly switching between two operating modes, water supply/water recharging.

Therefore, the backflow prevention devices of this application employ a structure that is purely mechanical to control the water pressure switch inside the control valve assembly, to control the movement of the inlet sealing member (e.g., through the water pressure difference inside the control valve assembly), and to control the opening/closing of the inlet sealing member. This arrangement advantageously allows the backflow prevention devices to rapidly switch between two operating modes, water supply/water recharging, and effectively prevent backflow while maintaining the normal operations of the apparatus employing the backflow prevention device. The purely mechanical structures of the backflow prevention devices advantageously provide high reliability while reducing the cost due to the simplified structure.

A reset spring may be provided to provide the reciprocating motion of the mobile water tank 2. For example, the reset spring may be disposed between the mobile water tank 2 and the protective housing 1, such as to bias the mobile water tank 2 (relative to the housing 1) in a direction (e.g., upward to work against the force of gravity). According to other examples, one or more reset springs may be provided at other positions/locations on/in the backflow prevention device.

In an example, the inlet sealing member 4 is supported at the inlet 319 through a support part. In another example, a side of the inlet sealing member 4 is connected to the inlet 319 in a way that allows for the inlet sealing member 4 to close the inlet 319, such as when the water pressure difference in the control valve assembly 3 is zero, and open the inlet 319, such as when a water pressure difference is present in the control valve assembly 3. The inlet sealing member 4 includes a material that has high elasticity and durability to provide a good seal. A rubber membrane material is one such example with high elasticity, good sealing effect, and high durability.

In an example, the outlet hole sealing member 5 is slidably disposed inside the shell inlet chamber 321. The outlet hole sealing member 5 may be directly connected (e.g., structurally) with the mobile water tank 2 by extending a portion of the outlet hole sealing member 5 through the second outlet hole 323. The outlet hole sealing member 5 may be indirectly connected (e.g., structurally) with the mobile water tank 2, such as through one or more intervening elements. Structurally connecting the outlet hole sealing member 5 and the water tank 2 may advantageously drive movement of the outlet hole sealing member 5 upon movement of the water tank 2 (or vice versa). For example, the structural connection may maintain synchronous movements between the mobile water tank 2 and the outlet hole sealing member 5 to open/close the second outlet hole 323.

In an example, an area of the second outlet hole 323 is greater than an area of the first outlet hole 318, such that a flow rate (i.e., water flow per unit time) of the second outlet hole 323 is greater than a flow rate of the first outlet hole 318. This arrangement advantageously ensures that, when water in the mobile water tank 2 does not reach the threshold amount (e.g., volume, weight, etc.), the water pressure in the shell inlet chamber 321 is maintained at a lower pressure than the water pressure in the control valve cap 31. During this time, the inlet 319 remains in an open state and the mobile water tank 2 remains in the water supplying position.

As shown in FIGS. 7-9, the control valve cap 31 includes a water stop rib 314 on an inside of the control valve cap 31. The water stop rib 314 extends toward the inlet sealing member 4 (e.g., downwardly), and the inlet 319 is formed between the inlet sealing member 4 and the water stop rib 314. Thus, the inlet 319 is defined by the water stop rib 314 and the inlet sealing member 4.

As discussed, the inlet sealing member 4 can move upward (e.g., under the action by the water pressure inside the control valve assembly 3) to engage with the water stop rib 314 to close the inlet 319. Thus, the inlet 319 is in the closed position when the inlet sealing member 4 engages (e.g., contacts) the water stop rib 314. For example, when the water pressure in the shell inlet chamber 321 is equal to the water pressure in the control valve cap 31, the inlet sealing member 4 moves toward the side of the water stop rib 314 to sealingly engage (e.g., engage to form a seal) with the water stop rib 314 to close the inlet 319. Thus, the inlet 319 is in the closed state.

The inlet sealing member 4 can also move downward to disengage from the water stop rib 314 to open the inlet 319. Thus, the inlet 319 is in the open position when the inlet sealing member 4 is disengaged from (e.g., does not contact) the water stop rib 314. When the water pressure in the shell inlet chamber 321 is lower than the water pressure in the control valve cap 31, the inlet sealing member 4 moves away from a contact surface (e.g., a side, a bottom, etc.) of the water stop rib 314 to open the inlet 319. Thus, the inlet 319 is in an open state.

Figure 13:
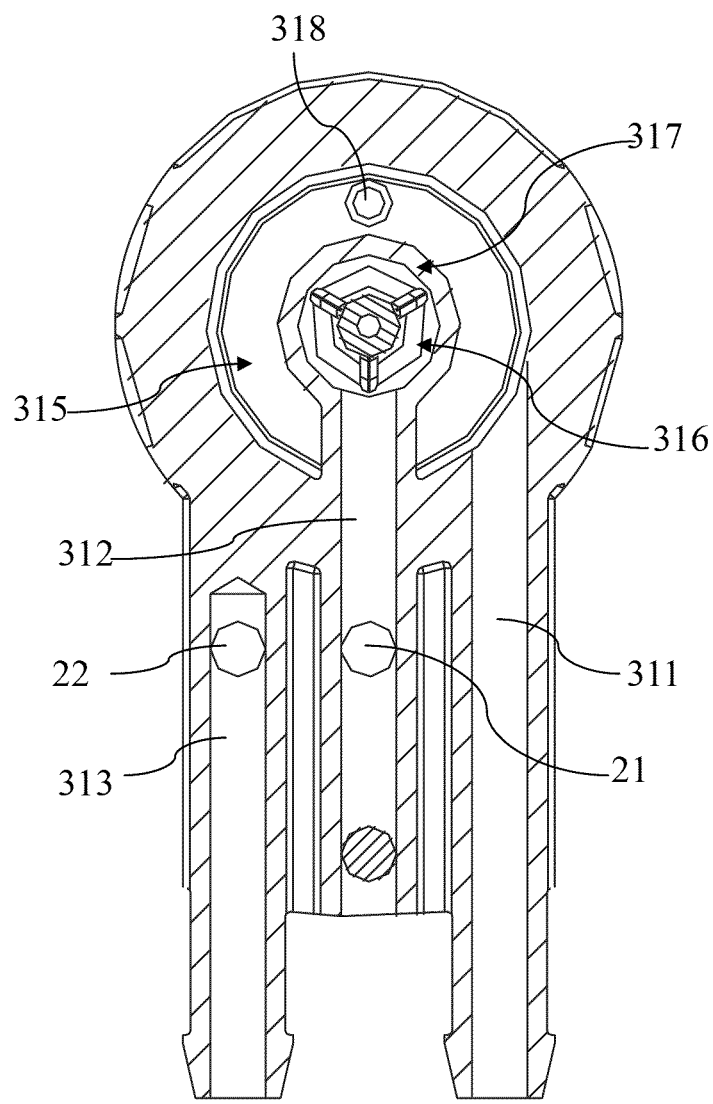
FIG. 13 is an enlarged view of a portion of the control valve inlet chamber and the control valve outlet chamber shown in FIG. 12.
Figure 14:
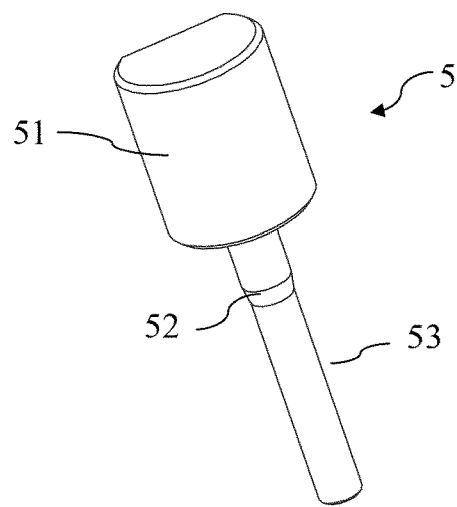
FIG. 14 is a perspective view of an exemplary embodiment of a structure of an outlet hole sealing member for use with a backflow prevention device.
Figure 15:
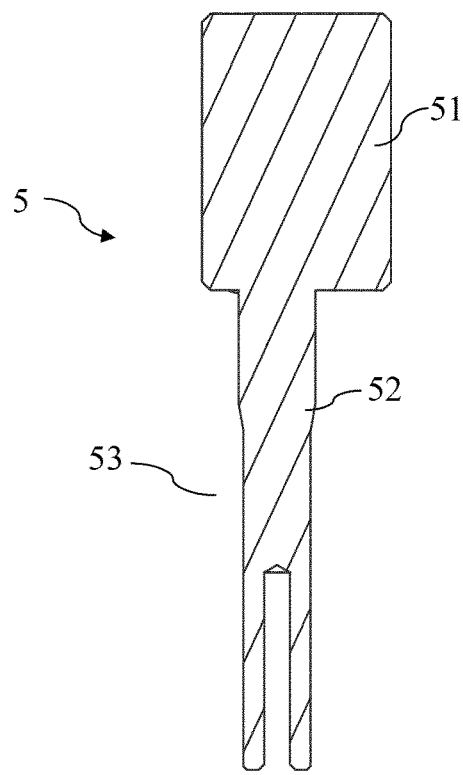
FIG. 15 is a cross-sectional view of the outlet hole sealing member shown in FIG. 14.

As shown in FIGS. 12 and 13, each of the control valve inlet chamber 315 and the control valve outlet chamber 316 has an annular shape. Although, each chamber may have other suitable shapes. The control valve inlet chamber 315 is shown disposed on an outer side (e.g., outside in a radial direction from a centerline) of the control valve outlet chamber 316 with an annular chamber water stop rib 317 disposed between the control valve inlet chamber 315 and the control valve outlet chamber 316. When water can flow over the chamber water stop rib 317, water will flow from the control valve inlet chamber 315 into the control valve outlet chamber 316 through the inlet 319. Configuring both the control valve inlet chamber 315 and the control valve outlet chamber 316 with an annular shape is advantageous for the overall structure layout by reducing the structural size.

The inlet 319 may also be configured having an annular shape. For example, the annular shaped inlet 319 may be configured similar to the annular chamber water stop rib 317. The water stop rib 314 may also be configured having an annular shape, such as above the inlet sealing member 4. This arrangement may advantageously increase the area of the inlet 319 to thereby increase the rate at which water is supplied into the control valve outlet chamber 316 from the control valve inlet chamber 315.

As shown best in FIGS. 14-18, the second outlet hole 323 is disposed in the inlet chamber bottom plate 322 of the shell inlet chamber 321. The outlet hole sealing member 5 includes a sealing member head 51 slidably disposed inside the shell inlet chamber 321, a conical sealing portion 52 connected with the sealing member head 51 and capable of sealing the second outlet hole 323, and a sealing member body 53 connected with the conical sealing portion 52 and extending through the second outlet hole 323. The sealing member body 53 is configured to connect with the mobile water tank 2, as shown in FIG. 7, such as to synchronize the movement therebetween. A portion of the outlet hole sealing member 5 (e.g., between the sealing member body 53 and the conical sealing portion 52) has a radius that gradually increases when moving in the direction from the sealing member body 53 to the sealing member head 51. Thus, the portion may be tapered.

The outlet hole sealing member 5 may be configured as a slide bar that is slidably disposed inside the shell inlet chamber 321. The outlet hole sealing member 5 includes a sealing member head 51, a conical sealing portion 52, and a sealing member body 53, all of which may be formed integrally or formed separately then coupled together. In the direction from the sealing member body 53 to the sealing member head 51, the radius of the conical sealing portion 52 may be configured to gradually increase. A first region (e.g., portion, part, section, etc.) of the conical sealing portion 52 that is close to the sealing member head 51 has a relatively big radius and can seal the second outlet hole 323 (see FIGS. 16 and 17). A second region of the conical sealing portion 52 that is close to the sealing member body 53 has a relatively small radius (compared to the first region) and is configured (e.g., sized) not to seal the second outlet hole 323.

The sealing member head 51 is disposed inside the shell inlet chamber 321 and can move upward and downward relative to the shell inlet chamber 321. The sealing member body 53 extends through the second outlet hole 323 and is connected with the mobile water tank 2. Thus, the sealing member body 53 can maintain linked or synchronous movement with the mobile water tank 2.

The mobile water tank 2 begins to move downward when water in the mobile water tank 2 increases to the threshold volume/weight. The outlet hole sealing member 5 moves downward with the mobile water tank 2, and upon the downward moving conical sealing portion 52 moving to a specified (e.g., predetermined) position, the conical sealing portion 52 seals the second outlet hole 323. Thus, the second outlet hole 323 is in the closed state.

The mobile water tank 2 begins to move upward when water in the mobile water tank 2 decreases below the threshold volume/weight. The outlet hole sealing member 5 moves upward with the mobile water tank 2, and upon the upward moving conical sealing portion 52 reaching a specified position, the conical sealing portion 52 disengages from (e.g., opens) the second outlet hole 323. Thus, the second outlet hole 323 is in an open state.

For example, when the outlet hole sealing member 5 moves upward, a gap between the edge of the second outlet hole 323 and the conical sealing portion 52 gradually increases as the radius of the region of the conical sealing portion 52 disposed inside the second outlet hole 323 gradually decreases in the upward moving process. Accordingly, the water flow velocity increases, which rapidly decreases the water pressure in the shell inlet chamber 321 and, therefore, increases the water pressure difference between the shell inlet chamber 321 and the control valve cap 31. The pressure difference facilitates the rapid opening of the inlet sealing member 4.

Figure 18:
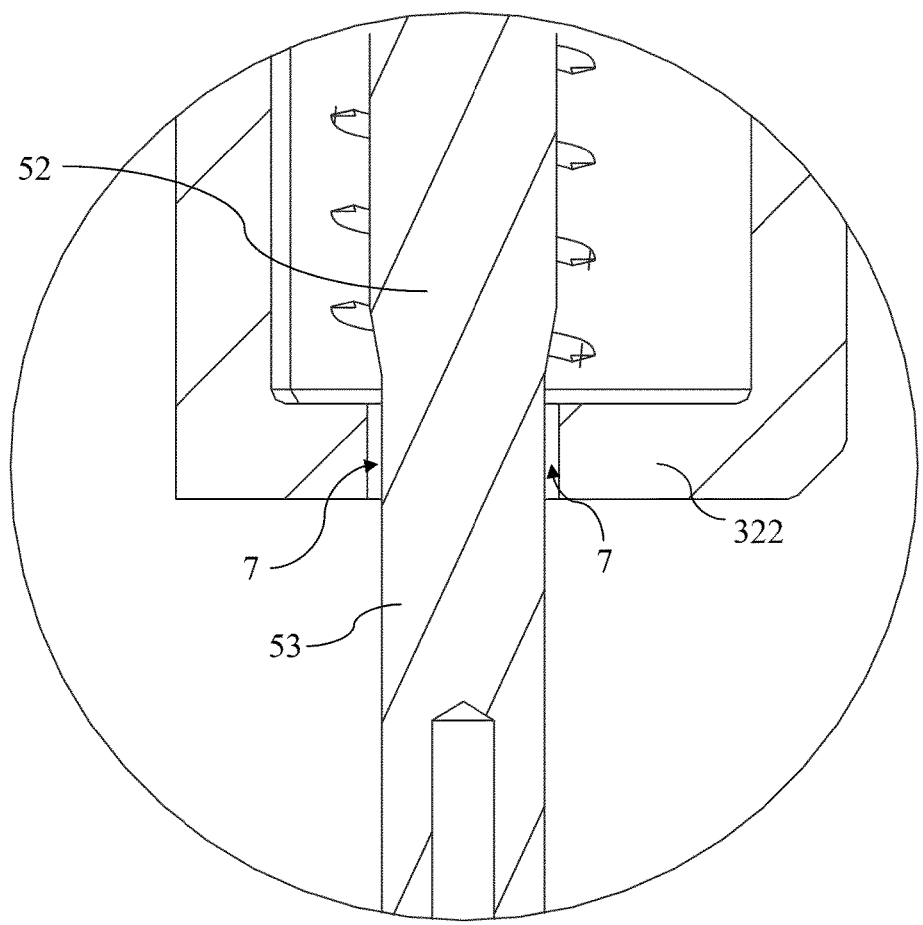
FIG. 18 is an enlarged view of a portion of the outlet hole sealing member and the control valve shell shown in FIG. 17, with an exemplary embodiment of a sealing member body in engagement with a second outlet hole.

As shown in FIGS. 17 and 18, a gap 7 is formed between the sealing member body 53 and the edge of the inlet chamber bottom plate 322 that defines the second outlet hole 323. Water is discharged through the gap 7 and the size of the gap 7 influences the amount of water that is discharged. In an example, the area of the gap 7 is greater than the area of the first outlet hole 318. A size (e.g., radius, cross-sectional area, etc.) of the sealing member body 53 is smaller than a size of the second outlet hole 323 to allow the sealing member body 53 to extend through the second outlet hole 323. This size difference forms/defines the gap 7 between the edge of the inlet chamber bottom plate 322 that defines the second outlet hole 323 and the sealing member body 53, permitting water to be discharged. In an example, the gap 7 is annular shaped.

The water pressure in the shell inlet chamber 321 can be maintained at a lower pressure than the water pressure in the control valve cap 31 to ensure that water in the mobile water tank 2 does not reach the threshold. The second outlet hole 323 and the inlet 319 may be held (e.g., maintained) in an open state, the area of the gap 7 may be configured (e.g., set) to be greater than the area of the first outlet hole 318, such that the water flow per unit time through the gap 7 is greater than the water flow per unit time through the first outlet hole 318, and the mobile water tank 2 can be maintained in the water supplying position.

As shown in FIGS. 1, 7 and 17, a reset spring 6 is provided between the inlet chamber bottom plate 322 and the outlet hole sealing member 5. The reset spring 6 is configured to bias the outlet hole sealing member 5 and the mobile water tank 2 to move in an upward direction. When the force of gravity from the weight of the mobile water tank 2 and water therein is greater than the acting (e.g., biasing) force of the reset spring 6, the mobile water tank 2 moves downward and drives the outlet hole sealing member 5 to close the second outlet hole 323. When water in the mobile water tank 2 is discharged to an amount resulting in the force of gravity (from the weight of the mobile water tank 2 and water therein) being smaller (e.g., less) than the acting force of the reset spring 6, the mobile water tank 2 and the outlet hole sealing member 5 are driven by the reset spring 6 to move upward to open the second outlet hole 323.

Also shown in FIG. 7, the control valve shell 32 is disposed within the mobile water tank 2 advantageously allowing water to flow from the shell inlet chamber 321 into the mobile water tank 2 and reducing the structural size.

As shown in FIGS. 6, 7 and 11, the protective housing 1 includes a water drain pipe 11, such as extending from a bottom portion thereof. When there is an excess amount of water in the mobile water tank 2, the excess water overflows from inside the mobile water tank 2 and is discharged through the water drain pipe 11 on the bottom of the protective housing 1. As shown, excess water may occupy a space between the mobile water tank 2 and the protective housing 1 and the space may be fluidly connected to the water drain pipe 11. In the case of backflow, the dirty water enters the protective housing 1 through the tank opening 20 of the mobile water tank 2 and ultimately is discharged through the water drain pipe 11 to protect clean water from being contaminated with the dirty water.

An operation method/process of an exemplary embodiment of a backflow prevention device will now be described. Although the process includes three steps, the process may include fewer or additional steps.

One step (e.g., the first step) includes, with the mobile water tank 2 in an elevated (e.g., relatively high) position due to the acting/biasing force applied from the reset spring 6, supplying water into the mobile water tank 2, while both the inlet 319 and the second outlet hole 323 are in open states. A first (e.g., small) quantity of water in the control valve inlet chamber 315 enters the shell inlet chamber 321 through the first outlet hole 318 and enters the mobile water tank 2 mainly through the second outlet hole 323. A second (e.g., large) quantity of water flows from the control valve inlet chamber 315 into the control valve outlet chamber 316 through the inlet 319 and enters the mobile water tank 2 through the control valve outlet pipe 312 and the water tank inlet 21.

Another step (e.g., the second step) includes the water in the mobile water tank 2 increasing to a threshold (e.g., a preset volume) where the force of gravity overcomes the acting/biasing force of the reset spring 6. Upon reaching the threshold, the mobile water tank 2 begins to move downward until reaching a lowered (e.g., relatively low, specified, etc.) position. In the lowered position, the conical sealing portion 52 on the outlet hole sealing member 5 engages/closes the second outlet hole 323 such that water is no longer supplied through the second outlet hole 323. When the second outlet hole 323 is closed, the water pressure in the shell inlet chamber 321 equalizes with (e.g., becomes equal to) the water pressure in the control valve cap 31, causing the inlet sealing member 4 to move upward to return to the default position (e.g., the elevated position). In the default position, the inlet sealing member 4 sealingly engages with the water stop rib 314 to close the inlet 319, such that water is no longer supplied to the mobile water tank 2 through the control valve outlet chamber 316.

Another step (e.g., the third step) includes discharging a predetermined (e.g., preset) quantity of water in the mobile water tank 2 through the water tank discharge pipe 313. Once the force of gravity from the mobile water tank 2 and water therein is less (e.g., smaller) than the acting/biasing force of the reset spring 6, the mobile water tank 2 and the outlet hole sealing member 5 move upward toward the elevated position. During this movement, the upward moving conical sealing portion 52 opens the second outlet hole 323 allowing water in the shell inlet chamber 321 to rapidly flow into the mobile water tank 2 through the second outlet hole 323. Once the water pressure in the shell inlet chamber 321 is less (e.g., lower) than the water pressure in the control valve cap 31, the inlet sealing member 4 moves downward and away from the water stop rib 314 to open the inlet 319. When the inlet 319 is open (e.g., in the open state), the control valve outlet chamber 316 supplies water into the mobile water tank 2.

It is noted that any of the above technical solutions may be combined to achieve the optimal technical effect. It is further noted that only exemplary examples of the backflow prevention devices of this application are described above, and that, to those skilled in the art, a number of other variations may be made on the basis of the principle of the exemplary examples, which shall also be deemed within the scope of protection of this application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure. It should be noted that terms used in the description, such as "front", "rear", "left", "right", "up" and "down", refer to the directions in the accompanying drawings, and terms "inside" and "outside" refer to a direction toward or away from the geometric center of a specific part, respectively.

The construction and arrangement of the elements of the backflow prevention devices, as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., control valve cap, control valve shell, mobile water tank, housing, sealing member, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A backflow prevention device, comprising:
   a housing;
   a water tank disposed inside of the housing and moveable relative to the housing;
   a control valve cap coupled to the housing and comprising a control valve inlet chamber and a control valve outlet chamber fluidly connected to each other through an inlet, wherein the control valve outlet chamber fluidly communicates with the water tank and the control valve inlet chamber includes a first outlet hole;
   a control valve shell connected to the control valve cap and comprising a shell inlet chamber that communicates with the first outlet hole, wherein the shell inlet chamber includes a second outlet hole that communicates with the water tank;
   an inlet sealing member for opening and closing the inlet to fluidly connect and disconnect the control valve inlet chamber and the control valve outlet chamber; and
   an outlet hole sealing member moveable with the water tank to open and close the second outlet hole;
   wherein closing the second outlet hole prevents water from flowing through the second outlet hole and switches the inlet from an open state to a closed state; and
   wherein opening the second outlet hole allows water to flow through the second outlet hole and switches the inlet from the closed state to the open state.

2. The backflow prevention device according to claim 1, wherein the first and second outlet holes each have an area, and the area of the second outlet hole is greater than the area of the first outlet hole.

3. The backflow prevention device according to claim 1, wherein each of the control valve inlet chamber and the control valve outlet chamber have an annular shape, the control valve inlet chamber is disposed on an outer side of the control valve outlet chamber, and an annular chamber water stop rib is disposed between the control valve inlet chamber and the control valve outlet chamber.

4. The backflow prevention device according to claim 1, wherein the control valve shell is disposed within a bore of the water tank.

5. The backflow prevention device according to claim 1, wherein the housing further includes a water drain pipe extending from a bottom wall thereof, the water drain pipe discharging excess water from the housing.

6. The backflow prevention device according to claim 1, wherein the outlet hole sealing member is operatively coupled to the water tank such that the outlet hole sealing member maintains synchronous movements with the water tank.

7. The backflow prevention device according to claim 1, wherein the control valve cap includes a water stop rib that extends toward the inlet sealing member, and the inlet is formed between the inlet sealing member and the water stop rib.

8. The backflow prevention device according to claim 7, wherein the inlet sealing member is configured to move in the event of a difference in water pressures between the shell inlet chamber and the control valve cap such that the inlet sealing member moves upward to engage with the water stop rib to close the inlet and moves downward to disengage from the water stop rib to open the inlet.

9. The backflow prevention device according to claim 8, wherein when the water pressure in the shell inlet chamber is less than the water pressure in the control valve cap, the inlet sealing member is configured to move downward to disengage from the water stop rib, and wherein when the water pressure in the shell inlet chamber is at least equal to the water pressure in the control valve cap, the inlet sealing member is configured to move upward to engage the water stop rib.

10. The backflow prevention device according to claim 1, wherein the second outlet hole is disposed in a bottom of the shell inlet chamber and the outlet hole sealing member comprises:
- a head slidably disposed inside the shell inlet chamber;
- a frusto-conical shaped sealing portion connected with the head for sealing the second outlet hole; and
- a body connected with the sealing portion and extending through the second outlet hole;
- wherein a radius of the sealing portion gradually increases when moving in a direction from the body to the head of the outlet hole sealing member.

11. The backflow prevention device according to claim 10, further comprising a reset spring provided between the bottom of the shell inlet chamber and the outlet hole sealing member to bias the outlet hole sealing member away from the bottom.

12. The backflow prevention device according to claim 10, wherein a gap is formed between the body and an edge of the bottom defining the second outlet hole, wherein water is discharged through the gap, and wherein the body is connected to the water tank.

13. The backflow prevention device according to claim 12, wherein the gap and the first outlet hole each have an area, and the area of the gap is greater than the area of the first outlet hole.

14. A backflow prevention device for use with a bathroom apparatus, the backflow prevention device comprising:
- a tank for holding water;
- a control valve assembly comprising:
  - a cap comprising an inlet chamber and an outlet chamber, which is fluidly connected with the tank; and
  - a shell coupled to the cap and comprising an inlet chamber that fluidly communicates with an outlet hole of the cap, wherein the inlet chamber of the shell includes an outlet hole that fluidly communicates with the tank;
- a first sealing member that is moveable relative to the cap between a first position, in which the inlet and outlet chambers of the cap are fluidly connected, and a second position, in which inlet and the outlet chambers of the cap are fluidly disconnected; and
- a second sealing member that is moveable relative to the shell between an open position, in which inlet chamber of the shell is fluidly connected to the tank, and a closed position, in which inlet chamber is fluidly disconnected from the tanks;
- wherein the tank and the second sealing member are configured to move downward after a volume of water in the tank reaches a threshold, and wherein the tank and the second sealing member are configured to move upward after the volume of water in the tank drops below the threshold due to an upward biasing force.

15. The backflow prevention device according to claim 14, wherein closing the second sealing member is configured to switch the first sealing member from the first position to the second position; and wherein opening the second sealing member is configured to switch the first sealing member from the second position to the first position.

16. The backflow prevention device according to claim 14, wherein the second sealing member is coupled to the tank such that a movement of the tank results in a corresponding synchronous movement of the second sealing member.

17. A control valve assembly for use in a backflow prevention device having a water tank moveably disposed in a housing, the control valve assembly comprising:
- a cap configured to couple to the housing and comprising an inlet chamber and an outlet chamber that is fluidly connected with the water tank;
- a shell coupled to cap and comprising an inlet chamber that is fluidly connected with both the cap and the water tank;
- a first sealing member located between the cap and the shell, wherein the first sealing member is moveable relative to the cap between an open position, in which the inlet chamber of the cap is fluidly connected with the outlet chamber of the cap to permit water to move freely between the inlet and outlet chambers of the cap, and a closed position, in which inlet chamber of the cap is fluidly disconnected with the outlet chamber of the cap to prevent water from flowing between the inlet and outlet chambers of the cap; and
- a second sealing member that is disposed in the inlet chamber of the shell between the first sealing member and a bottom of the shell, wherein the second sealing member and the water tank move together linearly in the inlet chamber of the shell relative to the shell between an open position, in which inlet chamber of the shell is fluidly connected to the water tank to permit water to flow from the inlet chamber of the shell into the water tank, and a closed position, in which inlet chamber is fluidly disconnected from the water tank to prevent water from flowing from the inlet chamber of the shell into the water tank.

18. The control valve assembly according to claim 17, wherein the second sealing member is coupled to the tank such that a movement of the tank results in a corresponding synchronous movement of the second sealing member.

19. The control valve assembly according to claim 17, wherein the first sealing member is configured to move between the open and closed positions in response to a difference between a water pressure in the inlet chamber of the shell and a water pressure in the cap.

20. The control valve assembly according to claim 19, wherein the first sealing member is configured to move to the open position when the water pressure in the inlet chamber of the shell is less than the water pressure in the cap, and the first sealing member is configured to move to the closed position when the water pressure in the inlet chamber of the shell is at least equal to the water pressure in the cap.

* * * * *

UNITED STATES PATENT AND TRADEMARK OFFICE
CERTIFICATE OF CORRECTION

| | | |
|---|---|---|
| PATENT NO. | : 10,145,092 B2 | Page 1 of 1 |
| APPLICATION NO. | : 15/179652 | |
| DATED | : December 4, 2018 | |
| INVENTOR(S) | : Yong Ji | |

It is certified that error appears in the above-identified patent and that said Letters Patent is hereby corrected as shown below:

In the Claims

In Claim 14, Column 17, Line 56: delete "tanks" and insert -- tank --.

Signed and Sealed this
Nineteenth Day of February, 2019

Andrei Iancu
*Director of the United States Patent and Trademark Office*